Dec. 25, 1956 J. J. Z. VAN ZELST 2,775,657

DUAL CHANNEL AMPLIFYING CIRCUIT

Filed April 3, 1952 2 Sheets-Sheet 1

INVENTOR
Johannes Jacobus Zaalberg van Zelst
BY Fred M Vogel
AGENT

Dec. 25, 1956 J. J. Z. VAN ZELST 2,775,657

DUAL CHANNEL AMPLIFYING CIRCUIT

Filed April 3, 1952 2 Sheets-Sheet 2

INVENTOR

Johannes Jacobus Zaalberg van Zelst

BY Fred M Vogel

AGENT 2,775,657

DUAL CHANNEL AMPLIFYING CIRCUIT

Johannes Jacobus Zaalberg Van Zelst, Eindhoven, Netherlands, assignor to Hartford National Bank and Trust Company, Hartford, Conn., as trustee Application April 3, 1952, Serial No. 280,224

Claims priority, application Netherlands April 19, 1951

7 Claims. (Cl. 179—171)

This invention relates to amplifying circuits comprising a main amplifier and a spare amplifier, each having an input circuit, an output circuit and a negative feedback circuit, the two input circuits being coupled to the same signal source and the two output circuits being coupled to the same load impedance.

Amplifiers of this kind are used, for example, for telephone purposes, the main amplifier serving to amplify a telephone input signal and the spare amplifier serving to take over the task of the main amplifier upon failure of the main amplifier, for example due to one of its tubes becoming defective.

The invention, in such circuits, makes it possible to obtain an amplifying curve having a distortion considerably smaller than that of each amplifier separately. It is characterized in that for the feed-back coefficients of the negative feedback circuits the following conditions are substantially fulfilled:

$$a_a=\frac{q_a}{N_0}-\frac{1}{\mu_{a0}}$$

$$a_b=K\frac{q_a}{N_0}$$

$$b_a=\frac{q_b}{N_0}$$

$$b_b=\frac{q_b}{N_0}-\frac{1}{\mu_{b0}}$$

in which K represents a constant which obviously differs from 1, and in which the negative feedback coefficients $a_a$, $a_b$, $b_a$ and $b_b$ are defined in accordance with $$V_{ta}=a_aE_a+a_bE_b$$
$$V_{tb}=b_aE_a+b_bE_b$$

$V_{ta}$ and $V_{tb}$ indicating the negative feedback voltages supplied back to the input circuits of the amplifiers A and B respectively, $E_a$ and $E_b$ indicating the voltages set up across the load impedance when the spare amplifier B or the main amplifier A respectively is made inoperative (without varying their internal resistances), $q_a$ and $q_b$ indicating the fractions in which the input signal voltage is supplied to the input circuits of the amplifiers A and B respectively, $\mu_{a0}$ and $\mu_{b0}$ indicating the mean gain factors of the amplifiers A and B respectively, measured as a relation between the voltages $E_a$ and $E_b$ respectively and the input voltage of the amplifier concerned, and $N_0$ representing the amplification of the combined circuit.

More particularly the negative feedback circuit of the main amplifier is connected to a point having a voltage which is preponderantly dependent upon the amplification of the main amplifier, whereas the negative feedback circuit of the spare amplifier is connected to a point having a voltage which is substantially equally dependent upon the amplification of the main amplifier as upon that of the spare amplifier, whereby in normal operation of the amplifying circuit both of the amplifiers A and B are operative with the main amplifier A providing a relatively greater part and the spare amplifier B providing a relatively smaller part of the output voltage at said load impedance, and whereby in the event of failure of the main amplifier A, the spare amplifier B will automatically provide the entire amount of output voltage at said load impedance with an amplitude substantially equal to the amplitude of the output voltage obtained in normal operation of the amplifying circuit.

In order that the invention may be readily carried into effect, it will now be described in greater detail with reference to the accompanying drawing.

Figs. 2 to 5 show some simplified embodiments, of which

Figures 2, 3, 4, 5, 7:
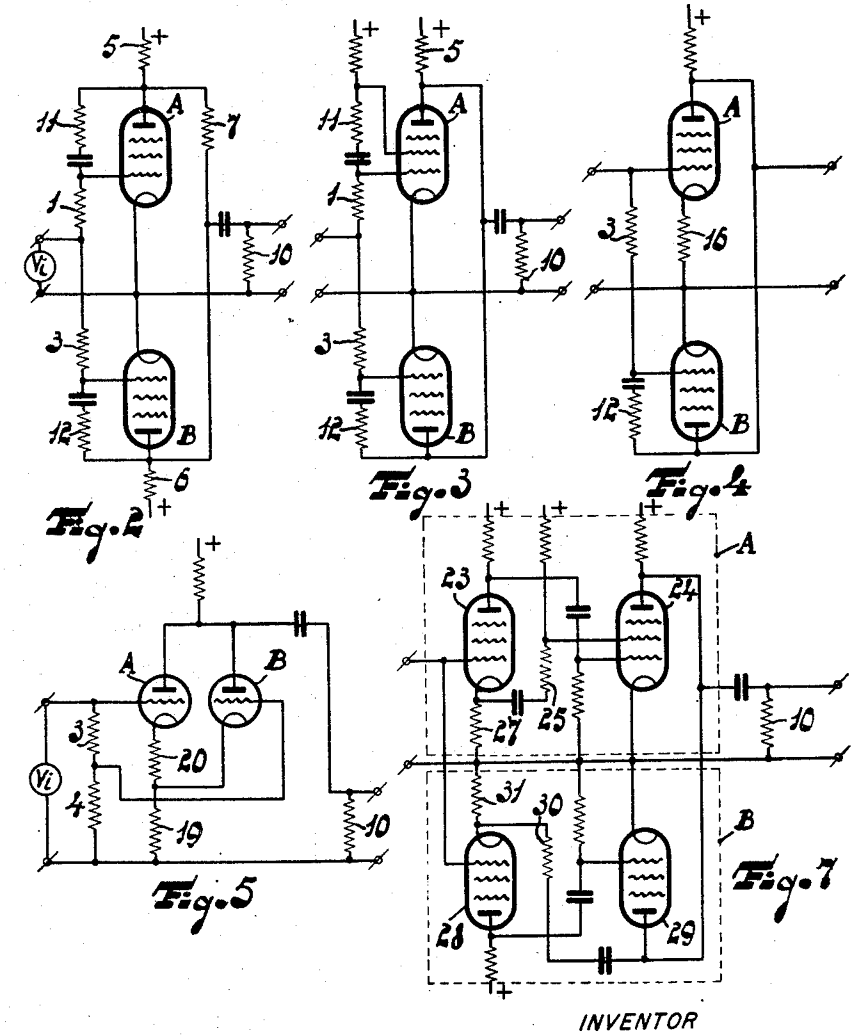

In Fig. 2 the impedances included in the output circuits are different for the two amplifiers, In Figs. 3 and 4 the negative feedback circuit and the load impedance are coupled to different output electrodes, and in Fig. 5 the impedances included in the input circuits are different for the two amplifiers.

Figure 6:
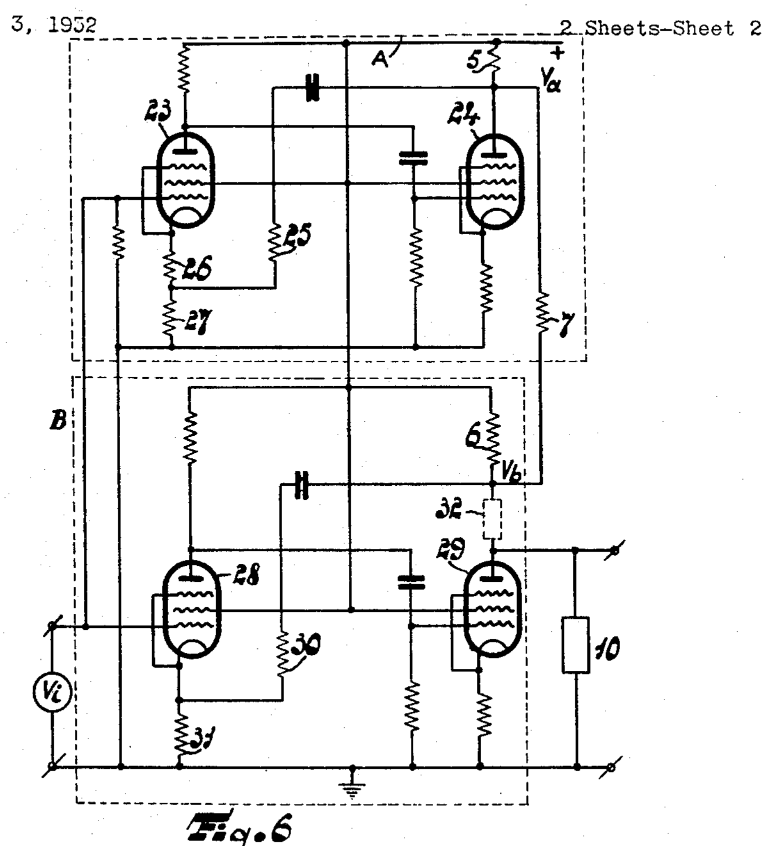

Fig. 6 shows a more elaborated modification of the circuit shown in Fig. 2, and

Fig. 7 shows a similar modification of the circuit of Fig. 3.

Figure 8:
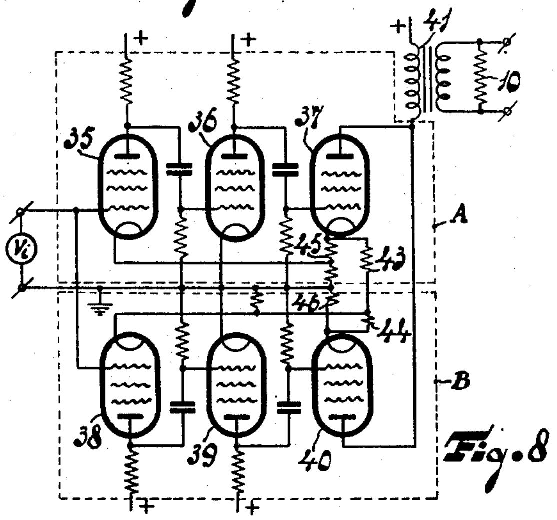

Fig. 8 shows an embodiment which is based on the circuit shown in Fig. 4.

Figure 1:
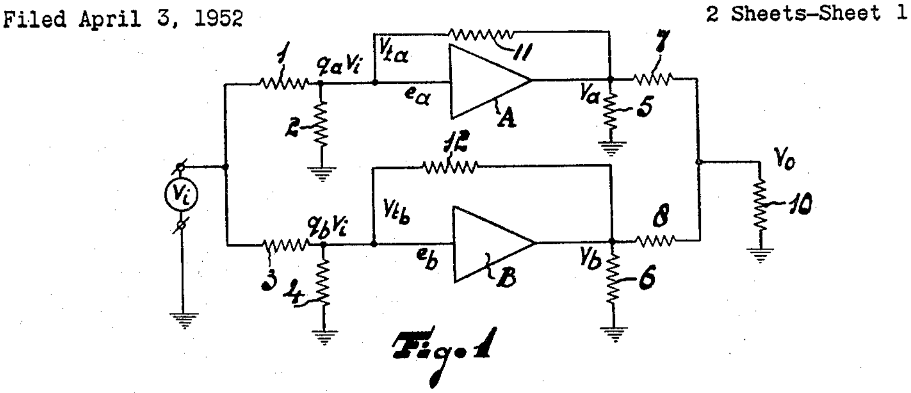
Fig. 1 shows the principle diagram of a circuit according to the invention.

In Fig. 1, the principle of an amplifier according to the invention is given in a general form. For the sake of simplicity, the required sources of supply voltage are omitted in the figures.

The signal voltage $V_i$ to be amplified is supplied by way of a first voltage divider having a division ratio $q_a$ and constituted by impedances 1 and 2 to the input circuit of a main amplifier A and by way of a second voltage divider having a division ratio $q_b$ and constituted by impedances 3 and 4 to the input circuit of a spare amplifier B. Thus, an amplified voltage $V_a$ is produced across an output impedance 5 of the main amplifier A and an amplified voltage $V_b$ is produced across an output impedance 6 of the spare amplifier B.

The two voltages are supplied by way of impedances 7 and 8 respectively to a load impedance 10, across which an output voltage $V_0$ is produced, which is equal to $$V_0=E_a+E_b \quad (1)$$

in which $E_a$ represents the voltage which would be produced across the load impedance 10 by the main amplifier A, if the spare amplifier B were inoperative, and $E_b$ represents the voltage which would be produced across the load impedance 10 by the spare amplifier B, if the main amplifier A were inoperative. Furthermore, a part $V_{ta}$ of the voltage $V_a$ is supplied as a negative feedback voltage by way of an impedance 11 to the input circuit of the main amplifier A and, in a similar manner, a part $V_{tb}$ of the voltage $V_b$ is supplied by way of an impedance 12 to the input circuit of the spare amplifier B.

Due to the coupling between the output circuits of the amplifiers A and B by way of the impedances 7, 8 and 10, the voltages $V_a$ and $V_b$ are not equal to the voltages $E_a$ and $E_b$, but are linearly dependent thereon. Thus, linear relations in $E_a$ and $E_b$ apply for the feedback voltages $V_{ta}$ and $V_{tb}$, viz.

$$V_{ta}=a_aE_a+a_bE_b$$
$$V_{tb}=b_aE_a+b_bE_b \quad (2)$$

in which $a_a$, $a_b$, $b_a$, $b_b$ represent negative feedback coefficients of the voltages $E_a$ and $E_b$ which are fed back around the amplifiers A and B, viz. $a_a$ is the coefficient of signal $E_a$ which is fed back around amplifier A, $a_b$ is the coefficient of signal $E_b$ which is fed back around amplifier A, $b_a$ is the coefficient of signal $E_a$ which is fed back around amplifier B, and $b_b$ is the coefficient of signal $E_b$ which is fed back around amplifier B, the values of which are determined by the impedances shown and the values of which may be immediately determined by making one of the two amplifiers A and B alternately inoperative, for example by switching off the heating current and temporarily adding a resistor to compensate for its internal resistance being varied thereby, and dividing the negative feedback voltages $V_{ta}$ and $V_{tb}$ supplied to the input impedances 2 and 4 by the voltages $E_a$ and $E_b$ thus produced across the load impedance 10.

For the input voltages $e_a$ and $e_b$ of the main amplifier and the spare amplifier respectively we thus find:

$$\begin{aligned} e_a &= q_a V_i - V_{ta} \\ e_b &= q_b V_i - V_{tb} \end{aligned} \qquad (3)$$

The gain factors $\mu_a$ and $\mu_b$ respectively of the amplifiers are defined in accordance with $$\mu_a = \frac{E_a}{e_a} \text{ and } \mu_b = \frac{E_b}{e_b} \text{ respectively} \qquad (4)$$

After writing the Equations 3 and 2 in Equation 4, the following relations apply:

$$\begin{aligned} \frac{E_a}{\mu_a} &= q_a V_i - a_a E_a - a_b E_b \\ \frac{E_b}{\mu_b} &= q_b V_i - b_a E_a - b_b E_b \end{aligned} \qquad (5)$$

By eliminating $E_a$ and $E_b$ from the said Equations 5, expressions are found for said magnitudes in $V_i$, which after adding and dividing by $V_i$ yield as the amplification N of the whole amplifying circuit:

$$N = \frac{E_a + E_b}{V_i} = \frac{\dfrac{q_a}{\mu_b} + \dfrac{q_b}{\mu_a} + q_a b_b + q_b a_a - q_a b_a - q_b a_b}{\left(\dfrac{1}{\mu_a} + a_a\right)\left(\dfrac{1}{\mu_b} + b_b\right) - a_b b_a} \qquad (6)$$

From this expression it follows that the amplification N and consequently also the distortion of the whole amplifying circuit is still a function of the gain factors $\mu_a$ and $\mu_b$ respectively of the individual amplifiers A and B.

Assuming that $N_0$ represents the desired amplification, then at given mean values $\mu_{a0}$ and $\mu_{b0}$ of the gain factors $\mu_a$ and $\mu_b$ respectively, the negative feedback coefficients $a_a$, $a_b$, $b_a$, $b_b$ are, according to the invention, so adjusted that in practice the following conditions are fulfilled:

$$\begin{aligned} a_a &= \frac{q_a}{N_0} - \frac{1}{\mu_{a0}} \approx \frac{q_a}{N_0} \\ a_b &= K\frac{q_a}{N_0} \\ b_a &= \frac{q_b}{N_0} \\ b_b &= \frac{q_b}{N_0} - \frac{1}{\mu_{b0}} \approx \frac{q_b}{N_0} \end{aligned} \qquad (7)$$

in which K is a constant which materially differs from 1, that is to say is smaller than 0.7 or larger than 1.3.

In this case the Expression 6 changes to $$\frac{N}{N_0} = \frac{(1-K)q_a q_b + q_b N_0\left(\dfrac{1}{\mu_a} - \dfrac{1}{\mu_{a0}}\right) + q_a N_0\left(\dfrac{1}{\mu_b} - \dfrac{1}{\mu_{b0}}\right)}{(1-K)q_a q_b + q_b N_0\left(\dfrac{1}{\mu_a} - \dfrac{1}{\mu_{a0}}\right) + q_a N_0\left(\dfrac{1}{\mu_b} - \dfrac{1}{\mu_{b0}}\right) + N_0^2\left(\dfrac{1}{\mu_a} - \dfrac{1}{\mu_{a0}}\right)\left(\dfrac{1}{\mu_b} - \dfrac{1}{\mu_{b0}}\right)} \qquad (8)$$

The conditions for $a_a$, $b_a$, $b_b$ according to (7) have the effect that the amplification in practice remains equal to $N_0$, both in the case that only the main amplifier A and in the case that only the spare amplifier B is operative, which may readily be verified with the aid of Formula 8 by substituting therein $\mu_a = \mu_{a0}$ and $\mu_b = 0$, and $\mu_a = 0$ and $\mu_b = \mu_{b0}$, respectively.

The condition for $a_b$ according to (7) furthermore results in a considerable reduction in distortion being obtained, which may be proved by writing the relative variation $$\frac{\Delta N}{N_0}$$

in which $\Delta N = N - N_0$, of the amplification as a function of the gain factors $\mu_a$ and $\mu_b$. It is here assumed that $$\begin{aligned} \mu_a &= \mu_{a0} + \Delta\mu_a \\ \mu_b &= \mu_{b0} + \Delta\mu_b \end{aligned} \qquad (9)$$

in which $\Delta\mu_a \ll \mu_a$ and $\Delta\mu_b \ll \mu_b$. For this purpose the left-hand and the right-hand term of the Equation 8 is reduced by 1, so that it follows:

$$\frac{\Delta N}{N} = \frac{-N_0^2 \Delta\mu_a \Delta\mu_b}{(1-K)q_a q_b \mu_{a0}\mu_{b0}\mu_a\mu_b - q_b N_0 \Delta\mu_a \mu_{b0}\mu_b - q_a N_0 \Delta\mu_b \mu_{a0}\mu_a + N_0^2 \Delta\mu_a \Delta\mu_b} \qquad (10)$$

In this expression $q_a$ and $q_b$ are either equal to 1 or at least not small with respect to 1, $\mu_{a0}$ and $\mu_{b0}$ being considerably greater than $N_0$, and this so much greater as the extent of backcoupling of each individual amplifier. Consequently, the Expression 10, so long as K appreciably differs from 1 and hence is either smaller than 0.7 or larger than 1.3, approximately changes to $$\frac{\Delta N}{N_0} \approx \frac{-N_0^2 \Delta\mu_a \Delta\mu_b}{(1-K)\mu_a^2 \mu_b^2} \qquad (11)$$

in which the relative variation in amplification $$\frac{\Delta N}{N_0}$$

is considerably smaller than if $K=1$.

This may be illustrated by a numerical example. Assuming that $\Delta\mu_a = \Delta\mu_b = \Delta\mu$; $q_a = q_b = 1$ and $$\mu_{a0} = \mu_{b0} = \mu_0 = gN_0$$

in which, as is common practice, $g$ is at least larger than 10. We thus find in the case that $K=1$:

$$\frac{\Delta N}{N_0} = \frac{+\Delta\mu}{2g\mu}$$

but in the case according to the invention in which, for example, $K=0$:

$$\frac{\Delta N}{N_0} = -\left(\frac{\Delta\mu}{g\mu}\right)^2$$

This makes a difference of a factor $$\frac{2\Delta\mu}{g\mu}$$

which factor is small with respect to 1.

From the fact that the constant K must appreciably differ from 1, it follows that the output circuits and the negative feedback circuits of the amplifiers are required to be chosen different if, for example, the same signal voltages are supplied to the input circuits of the amplifiers and hence the voltage dividers 1, 2 and 3, 4 have the same division ratios $q_a$ and $q_b$. In this case the main amplifier A is coupled by way of an impedance 7, which is of the same order of magnitude as the load impedance 10, to the latter impedance 10, the coupling impedance 8 between the spare amplifier B and the load impedance 10 and, if desired, also the output impedance 6 of the spare amplifier B being omitted. The feedback coupling by way of the impedances 11 and 12 respectively must be for the main amplifier A about a factor 2 lower than that for the spare amplifier B.

Fig. 2 shows a simplified example of an amplifier described in the preceding paragraph. The main amplifier A is coupled to load impedance 10 by way of a separating impedance 7, which is, for example, equivalent to load impedance 10, whereas the spare amplifier B is coupled to load impedance 10 without the interposition of any appreciable impedance. Consequently, in order to satisfy the Conditions 7 for equal amplification both in the case that only the amplifier A is operative and in the case that only the spare amplifier B is operative, the back coupling of the main amplifier A is required to be a factor 2 less than that of the spare amplifier B. If, for example, the coupling impedances 1 and 3 included between the signal source $V_i$ and the input circuits of the amplifiers A and B are equivalent, the negative feedback impedance 11 of the main amplifier A is thus required to have a value twice that of the negative feedback impedance 12 of the spare amplifier B.

However, the said inequality of the output and negative feedback circuits of the amplifiers A and B may also be obtained by coupling the negative feedback circuit of the main amplifier A to an output electrode other than the electrode to which the load impedance is coupled. In this case ensue, for example, the simplified embodiments shown in Figs. 3 and 4.

In Fig. 3, the anode of the main amplifying tube A, similarly as that of the spare amplifying tube B, is connected without the interposition of any appreciable impedances to load impedance 10. The negative feedback circuit 11—1 of the main amplifying tube A is, however, coupled to the screen grid of tube A. The negative feedback voltage supplied to the control grid of the spare amplifying tube B is consequently dependent upon both the voltage produced by the main amplifier A and that produced by the spare amplifier B across the load impedance 10, whereas the negative feedback voltage supplied to the control grid of the main amplifying tube A is dependent only upon the screen-grid amplification of the latter tube. Consequently, the negative feedback coefficient $a_b$ and the constant K are zero.

In a quite similar manner, in the embodiment shown in Fig. 4, the negative feedback voltage for the main amplifying tube A becomes dependent only upon the amplification of the main amplifier A by the interposition of a cathode impedance 16, whereas that of the spare amplifying tube B is dependent upon the gain factors of the two amplifying tubes A and B. The negative feedback impedances 16 and 12—3, of course, are still required to be adjusted in accordance with the Conditions 7, whereby the gain factors of the amplifiers A and B are equal when one amplifier is inoperative.

If, on the other hand, the coupling impedances between the corresponding output circuits of the amplifiers A and B and the load impedance 10 are chosen to be equal, for example, by omitting the coupling impedances 7 and 8, the condition that K materially differs from 1 implies that the input circuits and the negative feedback circuits of the amplifiers A and B are required to be different. Fig. 5 shows a simplified example of such a case.

In this example the full input voltage is supplied to the control grid of the main amplifying tube A, whereas the control grid of the spare amplifying tube B has supplied to it by way of the voltage divider 3, 4, for example, only half of the input voltage, that is to say $q_a=1$ and $q_b=\frac{1}{2}$. The cathode circuits of the tubes A and B furthermore include a common impedance 19, due to which the negative feedback coefficients $a_b$, $b_a$, $b_b$ acquire equal values whilst an additional, equivalent negative feedback impedance 20 is included only in the cathode circuit of the main amplifier A, so that the negative feedback coefficient $a_a$ becomes the twofold of the other negative feedback coefficients. When the terms $$\frac{1}{\mu_{a0}}$$

and $$\frac{1}{\mu_{b0}}$$

respectively are neglected with respect to $$\frac{q_a}{N_0}$$

and $$\frac{q_b}{N_0}$$

respectively—a neglection which in itself is by all means permissible— the Conditions 7 are fulfilled, whereby the constant $K=\frac{1}{2}$.

Fig. 6 shows a further elaborated embodiment similar to that shown in Fig. 2. The main amplifier A comprises amplifying tubes 23, 24 and the spare amplifier B comprises tubes 28 and 29. The coupling impedance 7 included between the output impedance 5 of the main amplifier A and the load impedance 10 is of the same order of magnitude as the load impedance 10, whilst the negative feedback of the main amplifier A by way of the impedances 25, 26, 27 is smaller than that of the spare amplifier B by way of the impedances 30, 31.

Assuming that $V_i$ represents the voltage at the input circuits of the amplifiers, $V_a$ the voltage across the output impedance 5, $V_b$ the voltage across the impedance 6, $$\frac{1}{r_a}$$

the negative feedback factor and $r_a g_a$ the amplification of the main amplifier A, the latter measured as a relation between $V_a$ and $V_i$ in the absence of negative feedback and with the amplifier B switched off, $$\frac{1}{r_b}$$

the negative feedback factor and $r_b g_b$ the amplification of the spare amplifier B, the latter measured as a relation between $V_b$ and $V_i$ in the absence of negative feedback and with the amplifier A switched off, $p_a$ the voltage across the impedance 6 divided by a voltage supplied to the impedance 5, measured with the amplifiers A and B switched off, and $p_b$ the voltage across the impedance 5 divided by a voltage supplied to the impedance 6, also measured with the amplifiers A and B switched off, we find:

$$\mu_a = p_a r_a g_a$$

$$\mu_b = r_b g_b$$

$$a_a = \frac{1}{p_a r_a}$$

$$a_b = \frac{p_b}{r_a}$$

$$b_a = \frac{1}{r_b}$$

$$b_b = \frac{1}{r_b}$$

$$V_a = r_a g_a\left(V_i - \frac{V_a}{r_a}\right) + r_b g_b p_b\left(V_i - \frac{V_b}{r_b}\right)$$

$$V_b = r_a g_a p_a\left(V_i - \frac{V_a}{r_a}\right) + r_b g_b\left(V_i - \frac{V_b}{r_b}\right)$$

from which after elimination of $V_a$, it follows for the amplification N:

$$N=\frac{V_b}{V_i}=\frac{r_ag_ap_a+r_bg_b+r_bg_ag_b(1-p_ap_b)}{1+g_a+g_b+g_ag_b(1-p_ap_b)}$$

From this follows by differentiation $$\frac{dN}{N}=\frac{(r_ap_a+r_ag_bp_a-r_bg_bp_ap_b)dg_a}{(r_ag_ap_a+r_bg_b+r_bg_ag_b-r_bg_ag_bp_ap_b)}+\frac{(1+g_a-g_ap_ap_b)(r_b+r_bg_a-r_ag_ap_a)dg_b}{(1+g_a+g_b+g_ag_b-g_ag_bp_ap_b}$$

If impedance 7 were left out, then $p_a=p_b=1$, so that when assuming $r_a=r_b=r$ (equal amplification of the amplifiers A and B) and $g_a$ and $g_b$ great with respect to 1, we have $$\frac{dN}{N}=\frac{dg_a+dg_b}{(g_a+g_b)^2}$$

However, by providing the impedance 7, which is of the same order of magnitude as the load impedance 10, $p_a$ and $p_b$ become smaller than 1, for example between 0.3 and 0.7, whilst as the condition that amplifier A produces across the impedance 10, with the amplifier B switched off, a voltage equal to that produced by the amplifier B across the impedance 10 with the amplifier A switched off, there applies $r_b=r_ap_a$ and hence $$\frac{dN}{N}=\frac{dg_a}{g_a^2g_b(1-p_ap_b)}+\frac{dg_b}{g_ag_b^2(1-p_ap_b)}$$

in which, as before, $g_a$ and $g_b$ are assumed to be great with respect to 1.

Consequently it will be seen that the coefficients of $dg_a$ and $dg_b$, which are a measure of the distortion occurring, become considerably smaller in the latter case. If in the example given it is assumed, for example, that $N=r_b=100$, $p_a=p_b=½$, $r_a=200$, $r_ag_a=r_bg_b=10{,}000$, we find $$\frac{dN}{N}=\frac{1}{3750}\left(\frac{dg_a}{g_a}+\frac{dg_b}{g_b}\right)$$

but when leaving out the impedance 7 and $N=r_a=r_b=100$ and $g_a=g_b=100$:

$$\frac{dN}{N}=\frac{1}{400}\left(\frac{dg_a}{g}+\frac{dg_b}{g}\right)$$

It appears that in the former case it is substantially the amplifier A, but in the second case both amplifiers which supply energy to the load impedance 10 to an equal extent, which applies as a general rule for the embodiments shown.

The above-mentioned formulae for the negative feedback coefficients $a_a$ and $b_b$ satisfy to a very good approximation the Conditions 7, since $$\frac{1}{\mu_0}$$

is negligible with respect to $$\frac{1}{N_0}$$

However, the conditions may be fulfilled exactly by the interposition of an impedance 32 in the anode circuit of the tube 29, which then must be $$\frac{1}{r_b}\times\text{the impedance } \mathbf{6}$$

Fig. 7 shows a modification of the embodiment shown in Fig. 3, in which as before the two amplifiers A and B comprise two amplifying tubes 23, 24 and 28, 29 respectively and in which the negative feedback circuit 30, 31 of the spare amplifier B is coupled to the load impedance 10, so that the negative feedback voltage thus produced is dependent upon the amplification of the two amplifiers, whereas the negative feedback circuit 25, 27 of the main amplifier A is coupled to the screen grid of the last tube 24 thereof and hence is dependent only upon the amplification of the main amplifier A.

In the embodiment shown in Fig. 8, the amplifiers A and B each comprise three tubes 35, 36, 37 and 38, 39, 40 respectively. The input circuits of the two amplifiers are connected to the signal source $V_i$ without the interposition of any appreciable impedances, the anode circuits of the last tubes 37 and 40 respectively supplying in common the load impedance 10 by way of an output transformer 41. The couplings between the cathode circuits of the tubes 37 and 40 respectively and the input circuits, notably the cathode circuits of the first tubes 35 and 38 respectively of the amplifiers A and B are different, however, the cathodes of the tubes 37 and 40 being connected together by way of, for example, equivalent impedances 43 and 44 respectively, and the negative feedback voltage supplied to the cathode of tube 38 of spare amplifier B being derived from the junction between the impedances 43 and 44 and thus being dependent upon the amplification of the two amplifiers A and B. The cathodes of the tubes 37 and 40 are furthermore connected by way of, for example, equivalent impedances 45 and 46 respectively to a point of constant potential, the negative feedback voltage supplied to the cathode circuit of tube 35 of the main amplifier A, however, being derived only from a cathode resistance 45 of tube 37 and hence substantially being dependent only upon the amplification of the main amplifier A.

In the embodiments shown, we always reckoned with a positive value for K. However, it is also possible to give K a negative value in which event the negative feedback voltage of the main amplifier A, so far as it originates from the spare amplifier B, inverses in phase. This is ensured, for example, in the circuit shown in Fig. 6 by providing a coupling impedance (not shown) between the cathodes of the tubes 29 and 23.

The impedances which are shown as resistances, may under certain conditions be substituted for by transformers, in which event one impedance, for example impedance 7, might be constituted by the leakage impedance of such a transformer.

If desired, the impedance 6 may, under certain conditions, form part of the load impedance 10.

What I claim is:

1. An amplifying circuit comprising a main amplifier A and a spare amplifier B, each having an input circuit, an output and a negative feedback circuit, a signal source, means connecting the two input circuits to said signal source, a load impedance, and means connecting the two output circuits to said load impedance, characterized in that for the negative feedback coefficients of the negative feedback circuits the following conditions are substantially fulfilled:

$$a_a=\frac{q_a}{N_0}-\frac{1}{\mu_{a0}}$$

$$a_b=K\frac{q_a}{N_0}$$

$$b_a=\frac{q_b}{N_0}$$

$$b_b=\frac{q_b}{N_0}-\frac{1}{\mu_{b0}}$$

in which K represents a constant having a value which differs from 1 by an amount to at least 30% of 1, and in which the negative feedback coefficients $a_a$, $a_b$, $b_a$ and $b_b$ are defined in accordance with $$V_{ta}=a_aE_a+a_bE_b$$

$$V_{tb}=b_aE_a+b_bE_b$$

in which $V_{ta}$ and $V_{tb}$ indicate the negative feedback voltages supplied to the input circuits of the amplifiers A and B respectively, $E_a$ and $E_b$ respectively represent the voltages produced across the load impedance when the spare amplifier B or the main amplifier A respectively is made temporarily inoperative by switching off the heating current and temporarily adding a resistor to compensate for its internal resistance being varied thereby, $q_a$ and $q_b$ represent the fractions in which the signal voltage is supplied to the input circuits of the amplifiers A and B respectively, $\mu_{a0}$ and $\mu_{b0}$ represent the mean amplification factors of the amplifiers A and B respectively, measured as a relation between the voltages $E_a$ or $E_b$ respectively and the input voltage of the amplifier concerned, and $N_0$ represents the amplification of the circuit, whereby in normal operation of the amplifying circuit both of the amplifiers A and B are operative with the main amplifier A providing a relatively greater part and the spare amplifier B providing a relatively smaller part of the output voltage at said load impedance, and whereby in the event of failure of the main amplifier A, the spare amplifier B will automatically provide the entire amount of output voltage at said load impedance with an amplitude substantially equal to the amplitude of the output voltage obtained in normal operation of the amplifying circuit.

2. A circuit as claimed in claim 1, characterized in that the negative feedback circuit of the main amplifier is connected to a point in the output circuit of the main amplifier, the voltage of which is preponderantly dependent upon the amplification of the main amplifier, whereas the negative feedback circuit of the spare amplifier is connected to a point in the output circuit of the spare amplifier, the voltage of which in practice is equally dependent upon the amplification of the main amplifier as upon that of the spare amplifier.

3. A circuit as claimed in claim 2, in which said main and spare amplifiers are provided with output electrodes connected respectively to the output circuits of said main and spare amplifiers, said main amplifier being provided with a second output electrode, characterized in that the negative feedback circuit of the main amplifier is coupled to said second output electrode, the negative feedback circuit of the spare amplifier being coupled to both the load impedance and the output electrode of the second amplifier.

4. A circuit as claimed in claim 2, in which the input circuit of the spare amplifier includes a signal voltage divider, so that the signal supplied to the main amplifier is greater than the signal supplied to the spare amplifier, the main amplifier comprising not only a negative feedback circuit which is common to the two amplifiers, but also a negative feedback circuit which is not common with the spare amplifier.

5. A circuit as claimed in claim 2, in which the negative feedback circuit of the main amplifier is coupled to an output electrode of this amplifier, and including a first coupling impedance connected between the main amplifier output circuit and said load impedance and a second coupling impedance connected between the spare amplifier output circuit and said load impedance, said first coupling impedance having a value of the same order of magnitude as that of the load impedance, this value of impedance being relatively high with respect to the value of said second coupling impedance.

6. An amplifying circuit as claimed in claim 5, characterized in that upon failure of both amplifiers the impedances in the output circuits of the two amplifiers have values at which the quotient of the voltage across the output impedance of the spare amplifier and a voltage supplied to the output impedance of the main amplifier, as well as the quotient of the voltage across the output impedance of the main amplifier and a voltage supplied to the output impedance of the spare amplifier is comprised between 0.3 and 0.7.

7. A circuit as claimed in claim 2, in which each of said amplifiers respectively comprises an amplifier tube having an anode and a cathode, said load impedance being connected in common to said anodes, and including two impedances connected in series between said cathodes, the negative feedback circuit of the spare amplifier being connected to the junction of said last-named two impedances, a source of operating current for said main amplifier, and an impedance connected between said source of operating current and the cathode of the main amplifier tube, the negative feedback circuit of the main amplifier being connected to a point on said last-named impedance.

References Cited in the file of this patent

UNITED STATES PATENTS

| | | |
|---|---|---|
| 2,020,317 | Jacobs | Nov. 12, 1935 |
| 2,210,028 | Doherty | Aug. 6, 1940 |
| 2,536,651 | Merhaut | Jan. 2, 1951 |
| 2,605,333 | Job | July 29, 1952 |

FOREIGN PATENTS

| | | |
|---|---|---|
| 484,287 | Great Britain | May 3, 1938 |
| 559,258 | Great Britain | Feb. 10, 1944 |
| 56,691 | Netherlands | July 15, 1952 |